Patented Feb. 10, 1931

1,792,041

UNITED STATES PATENT OFFICE

WINFIELD SCOTT, OF AKRON, OHIO, ASSIGNOR TO THE RUBBER SERVICE LABORATORIES CO., OF AKRON, OHIO, A CORPORATION OF OHIO

RUBBER-VULCANIZATION ACCELERATOR

No Drawing. Application filed May 22, 1925. Serial No. 32,188.

The present invention is directed to the art of manufacturing a rubber composition by employing as an accelerator of the vulcanizing process, a new type of compound as is hereinafter fully set forth and described.

Various types of reaction products of aldehydes and amines have recently become very important and widely used accelerators of the vulcanization of rubber. The use of any of these types of compounds not only makes possible the manufacture of a vulcanized rubber in a comparatively short period of time but imparts to the rubber product many desirable properties, such as high tensile strength, high modulus of elasticity, and the like.

The aldehyde-amine reaction products whose use as accelerators has heretofore been described, have consisted of substances produced by the interaction of equal molecular proportions of an aldehyde and an amine, as well as derivatives of such a reaction product. It is well known that an aldehyde, such as acetaldehyde and an amine, such as aniline will not only combine in equi-molecular proportions but that a stable compound can also be obtained by condensing one molecule of the aldehyde with two molecules of the amine. I have now found that the various derivatives of such compounds, and particularly the formaldehyde derivatives of croton aldehyde dianilide form a new class of compounds, all of which have proven of value in the rubber vulcanization process.

Although compounds of this type may be prepared by other methods, I have found the following procedure to result in maximum yields of a product of uniform quality and of a high degree of purity. One molecular proportion (70 parts) of crotonaldehyde is run slowly, and preferably in small portions over a period of time, into two molecular proportions (186 parts) of aniline. It is desirable to add the aldehyde to the amine in order to insure the presence of an excess of the latter during the entire reaction period in order to promote the formation of the di-anilide. It is furthermore advisable to agitate the mixture thoroughly during the reaction period in order to provide contact of the interacting substances to as great an extent as is possible. Moreover, it is essential that the reacting mixture be maintained at a temperature below 50° C. and preferably as near 35° C. as is possible. This may be done by employing any of the well known means devised for this purpose. Inasmuch as very considerable quantities of heat are evolved in the reaction, it is desirable that the addition of aldehyde be made in a manner such that the temperature may be readily maintained within the limits set forth.

If the addition of aldehyde has taken place at the proper rate, that is, in such a manner that one portion of aldehyde is allowed to react completely with the amine, before a further portion of aldehyde is added, the entire reaction will be completed shortly after the required total quantity of aldehyde has been added to the amine. It is usually desirable however, to allow the mixture to stand with or without stirring but preferably slightly warmed for a short period after all the action has apparently ceased, in order to allow the last traces of aldehyde and amine to interact.

In the condensation of an aldehyde and an amine, water is split off, and due to the agitation of the mixture by the stirring action, the water, ordinarily, emulsifies with the di-anilide formed. Stirring of the mixture is however necessary for the production of a uniform product by eliminating the possibility of overheating the reacting mass. The water is readily removed from the product, however, and the emulsification of the material offers no difficulties so far as this step of the process is concerned, but is in reality a positive advantage, in that it provides a means for the more ready reaction of the material in the final stage of the reaction.

The compound formed by the reaction in the example as described is as follows:

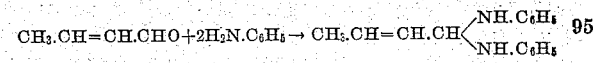

After the crotonaldehyde-aniline reaction is complete and the dianilide is formed, 80 parts of formaldehyde are added to the mass with complete stirring. Inasmuch as the reaction ensuing is likewise an exothermic change, it is desirable to add the formaldehyde at a slow rate, although with vigorous stirring and with provisions for cooling the mixture the aldehyde may be added fairly rapidly or if necessary, all at one time, if desired. The temperature of the reacting mass should, however, be mentioned at a point not appreciably above 80 degrees C. and preferably at about 50 to 70 degrees C. In order to completely react the entire quantity of aldehyde with the dianilide, it is desirable to stir the mixture for some minutes after all the ingredients have been added together. After the reaction is completed, the water produced by the condensation of the interacting substances is removed from the product in any manner desired, such as by means of a drying oven maintained at a temperature of approximately 105° centigrade or by means of a vacuum with heating, for example, a vacuum of approximately 25 inches and a temperature of approximately 90° C. The final reaction product is a dark colored resin-like mass which does not soften or become sticky when held in the hand, but which is not brittle enough to be ground readily. A somewhat harder product may be obtained by employing a larger proportion of formaldehyde than is specified in the example.

The dry product which may be termed the formaldehyde reaction product of crotonaldehyde-dianilide, as well as other aldehyde reaction products of the dianilides and similar derivatives of other aldehydes exerts a most vigorous action when compounded with sulfur into rubber and the rubber mix is subjected to the vulcanization process. Materials of this type may be used in a wide range of various kinds of rubber compounds which are readily apparent to those skilled in the art.

As an example of the use of compounds of the type as described in a rubber mix, the following representative mixture is given but it is to be understood that the example is illustrative only and not at all limitative of the use of the new class of accelerators described.

One hundred parts of rubber, for example, the grade known as smoked sheets, are mixed in the usual manner with 5 parts of zinc oxide, 3.5 parts of sulfur and 0.5 parts of one of the type of compounds as hereinbefore described, for example, the formaldehyde derivative of the dianilide of crotonaldehyde. The mixture is then vulcanized in the usual manner in presses at the temperature given by approximately 40 pounds of steam for a period depending upon the characteristics desired in the product. After heating the compound just described for 45 minutes, for example, the vulcanized product is found, upon testing, to have a modulus of elasticity at 300% elongation of 250, at 500% elongation a modulus of 659, and at 700% elongation a modulus of 2375. The tensile strength of the product at break is approximately 3755 pounds per square inch while the elongation at break is 790%. Properties such as those recorded are shown only by vulcanized rubber products of a particularly high grade. Equally desirable properties are imparted to a rubber product compounded with varying proportions of different ingredients by employing either my preferred accelerator as described or one of a group of related compounds.

Although I have particularly described the preparation and use of but one of a large number of analogous compounds that may likewise be employed advantageously in a rubber mix, I do not limit my invention to the use of the single compound mentioned. Broadly, my invention comprises the acceleration of the vulcanization of rubber by employing small quantities of a compound produced by the action of one or more molecular proportions of an unsaturated or a saturated aldehyde, preferably of the aliphatic series upon a compound resulting from the interaction of one molecular proportion of an aldehyde upon two molecular proportions of an aromatic primary amine. Thus, for example, I may use the various compounds resulting from the interaction of 1, 1.25, 1.5 or other molecular proportions of an aldehyde such as formaldehyde, acetaldehyde, propionaldehyde, acrolein, crotonaldehyde and the like, upon compounds formed by the combination of two molecular proportions of aniline, the toludines, the xylidenes or other aromatic primary amines with one molecular proportion of an aliphatic aldehyde.

My invention is not to be considered as limited by any theories made in explanation of the facts involved therein but is limited solely by the claims appended hereto and made a part of this specification wherein I intend to claim all novelty inherent in my invention as is permissible in view of the prior art.

What I claim is:

1. The process of vulcanizing rubber which comprises heating a mixture of rubber and sulfur in the presence of a small proportion of the product obtained by the reaction of formaldehyde with crotonaldehyde dianilide.

2. The process of vulcanizing rubber which comprises heating a mixture of rubber and sulfur in the presence of a small proportion of the product obtained by the reaction of less than two molecular proportions of formaldehyde upon one molecular proportion of crotonaldehyde-dianilide.

3. The vulcanized rubber product obtained by heating together a mixture of rubber, sulfur and the formaldehyde reaction product of crotonaldehyde dianilide.

4. The vulcanized rubber product obtained by heating together a mixture of rubber, sulfur and the reaction product of less than two molecular proportions of formaldehyde upon one molecular proportion of crotonaldehyde dianilide.

5. A vulcanization accelerator comprising the formaldehyde derivative of crotonaldehyde dianilide.

In testimony whereof I affix my signature.

WINFIELD SCOTT.